(12) United States Patent
Raad

(10) Patent No.: US 11,028,812 B2
(45) Date of Patent: Jun. 8, 2021

(54) INTEGRATED BRUSHLESS STARTER GENERATOR

(71) Applicant: Astronics Advanced Electronic Systems Corp., Kirkland, WA (US)

(72) Inventor: Bernard A. Raad, West Linn, OR (US)

(73) Assignee: Astronics Advanced Electronic Systems Corp., Kirkland, WA (US)

(*) Notice: Subject to any disclaimer, the term of this patent is extended or adjusted under 35 U.S.C. 154(b) by 0 days.

(21) Appl. No.: 15/650,032

(22) Filed: Jul. 14, 2017

(65) Prior Publication Data
US 2018/0030944 A1     Feb. 1, 2018

Related U.S. Application Data

(60) Provisional application No. 62/367,150, filed on Jul. 27, 2016.

(51) Int. Cl.
*H02P 9/00* (2006.01)
*F02N 11/04* (2006.01)
(Continued)

(52) U.S. Cl.
CPC ............ *F02N 11/04* (2013.01); *H02K 11/048* (2013.01); *H02P 9/302* (2013.01);
(Continued)

(58) Field of Classification Search
CPC ... H02P 9/302; H02P 9/08; H02P 1/50; H02K 7/1823; H02K 5/225; H02K 11/048; F02N 11/048; F02N 11/04; F02N 2011/0896
(Continued)

(56) References Cited

U.S. PATENT DOCUMENTS

| 4,138,629 A * | 2/1979 | Miller | H02K 23/52 310/113 |
| 4,797,602 A | 1/1989 | West | |

(Continued)

FOREIGN PATENT DOCUMENTS

| CN | 102159828 A | 8/2011 |
| EP | 0233738 A1 | 8/1987 |

OTHER PUBLICATIONS

European Patent Office, EP 17 18 3222, Search Report, dated Nov. 20, 2017.
(Continued)

*Primary Examiner* — Julio C. Gonzalez
(74) *Attorney, Agent, or Firm* — Wiggin and Dana LLP; Gregory S. Rosenblatt; Thomas M. Landman

(57) ABSTRACT

A brushless starter-generator system is contained within a single housing. The housing has a first end with an opening to receive a drive spline from a motive source and an opposing second end. A brushless, rotating machine is located adjacent the first end and is kinetically connectable to the drive spline. A power control unit is adjacent the second end and electrically coupled to the brushless, rotating machine. The brushless, rotating machine is selected from the group consisting of a synchronous machine, a permanent magnet machine, and an induction machine. Electrical and mechanical interfaces are identical to a like-rated brushed version for a true "drop-in" replacement capability to facilitate replacements and up-grades.

8 Claims, 10 Drawing Sheets

(51) Int. Cl.
  *H02K 11/04* (2016.01)
  *H02P 9/30* (2006.01)
  *H02K 5/22* (2006.01)
  *F02N 11/08* (2006.01)
  *H02K 7/18* (2006.01)
  *H02P 101/30* (2015.01)
  *H02P 1/50* (2006.01)
  *H02P 9/08* (2006.01)

(52) U.S. Cl.
  CPC ...... *F02N 2011/0896* (2013.01); *H02K 5/225* (2013.01); *H02K 7/1823* (2013.01); *H02P 1/50* (2013.01); *H02P 9/08* (2013.01); *H02P 2101/30* (2015.01)

(58) Field of Classification Search
  USPC .......................................................... 290/31
  See application file for complete search history.

(56) References Cited

U.S. PATENT DOCUMENTS

| | | | |
|---|---|---|---|
| 5,055,764 A | 10/1991 | Rozman et al. | |
| 5,097,195 A | 3/1992 | Raad et al. | |
| 5,581,168 A | 12/1996 | Rozman et al. | |
| 5,998,894 A | 12/1999 | Raad | |
| 6,094,797 A | 8/2000 | Sherman | |
| 6,844,707 B1* | 1/2005 | Raad | F02N 11/04 290/46 |
| 6,909,263 B2 | 6/2005 | Xu et al. | |
| 7,327,048 B2 | 2/2008 | Xu et al. | |
| 7,880,448 B2 | 2/2011 | Patterson | |
| 8,089,170 B2 | 1/2012 | Patterson | |
| 8,148,834 B2 | 4/2012 | Huang et al. | |
| 8,358,111 B2 | 1/2013 | Rozman et al. | |
| 8,531,144 B2 | 9/2013 | Tamai et al. | |
| 2004/0027078 A1* | 2/2004 | Xu | F02C 7/268 318/107 |
| 2007/0222220 A1* | 9/2007 | Huang | F02N 11/04 290/31 |
| 2008/0093850 A1* | 4/2008 | Taneja | F01D 15/10 290/36 R |
| 2008/0250792 A1* | 10/2008 | Wang | F02C 7/224 60/806 |
| 2012/0134114 A1 | 5/2012 | Kamenszky et al. | |
| 2013/0207490 A1* | 8/2013 | Spearman | F02N 11/04 310/48 |
| 2016/0079824 A1* | 3/2016 | McKinzie | H02K 5/20 310/63 |
| 2018/0187604 A1* | 7/2018 | Poumarede | B64D 35/08 |

OTHER PUBLICATIONS

Boeingedge/Aeromagazine, 787 Propulsion System, pp. 5-13, Quarter 3, 2012.
Second Office Action from China National Intellectual Property Administration, dated Jan. 20, 2020, for application No. CN 201710625580.7.
Search Report from China National Intellectual Property Administration, dated Dec. 24, 2019, for application No. CN 201710625580.7.

* cited by examiner

System & Functional Overview

INTEGRATED BRUSHLESS STARTER GENERATOR

CROSS-REFERENCE TO RELATED PATENT APPLICATION

This patent application claims a benefit to the Jul. 27, 2016 filing date of U.S. Provisional Patent Application Ser. No. 62/367,150, titled "Integrated Brushless Starter Generator." The disclosure of U.S. 62/367,150 is incorporated by reference herein in its entirety.

BACKGROUND OF THE DISCLOSURE

Starter-generator systems are widely used on aircraft and other vehicles with a reciprocating or gas turbine engine. The starter-generator is coupled to a shaft that connects to the engine or the turbine blades. During engine start, the starter-generator system functions as an electric motor rotating the shaft to start the engine. The starter-generator system functions as a motor from engine standstill until the engine speed is close to idle. Once the engine reaches idle speed, the starter-generator system functions as a generator that converts mechanical power from the moving engine, in the form of shaft rotation, to usable electrical power, such as 28 VDC (volts—direct current).

A typical starter-generator system is disclosed in U.S. Pat. No. 7,327,048, "Hybrid Gas Turbine Engine Starter-Generator," by Xu et al. that is incorporated by reference herein in its entirety. Carbon brushes, that are selectively moveable into, and out of, electrical contact with commutator segments electrically couple and decouple a DC power source from and to rotor windings. The entire starter-generator system is located in an engine nacelle, so repair or replacement is limited to a single portion of the aircraft and one system may be swapped-out with a replacement relatively easily. Problems with a brushed starter-generator system include a need to periodically replace the brushes and carbon wear out particles from the brushes create a dirty and sometimes hazardous environment. Other problems encountered include sparking, poor efficiency, poor reliability and poor cost of ownership There are starter-generator systems that do not require carbon brushes. One system is disclosed in U.S. Pat. No. 7,880,448, "Fault Clearing Method for Permanent Magnet Machines," by Patterson. This system includes a kinetic portion and a power conversion portion. The kinetic portion is located in the engine nacelle and the power conversion portion is located in a portion of the fuselage that is inaccessible from the passenger cabin. Electric current carrying cables connect the kinetic portion to the power conversion portion. U.S. Pat. No. 7,880,448 is incorporated by reference herein in its entirety.

Replacement or an up-grade from a brushed system to the above mentioned brushless starter-generator system requires access to both the engine nacelle and the fuselage. Typically, the interconnecting cables must also be replaced. Replacement and up-grade are time consuming, placing the aircraft out of service for an extended period of time.

There is a need for a starter-generator system that does not have the disadvantages described above. A typical brushed starter-generator system, is characterized by the following properties:

The motor operates on 28 volts direct current (VDC) provided from a battery. Because the battery may be partially depleted, the motor must be capable of starting the aircraft engines from an input of 18 VDC. The motor produces at least 25 foot-pounds of torque as a starter.

The generator output is at least 300 amps (A).

An external Generator Control Unit (GCU) is used to regulate the voltage and provide protective functions.

The starter-generator has a nominal weight of 32 pounds, a maximum diameter of 6 inches and a maximum length of 11 inches.

The starter-generator is air-cooled and does not require additional cooling coils.

As the starter-generator is mounted to a kinetic portion of the aircraft engine, the turbine shaft, additional characteristics required are:

Ability to provide extended life operation with exposure to an inlet temperature of up to 100° centigrade (C).

Ability to withstand extended exposure to 20G (20 times the force of gravity) vibration, between 0 and 2,000 Hz.

Ability to provide a maximum start power (25 foot-pounds of torque) required when the engine is soaked at a temperature of −40° C.

Ability to provide extended life operation with exposure to a soak-back temperature of up to 150° C.

Ability to provide extended life operation when exposed to airborne contaminants including sand, dust, salt spray, humidity, rain and chemical fluids.

Ability to resist modal (structural) distortion.

SUMMARY OF THE DISCLOSURE

Disclosed herein is a starter-generator system contained within a single housing. Its electrical and mechanical interfaces are identical to those of a brushed starter-generator, to facilitate replacements or up-grades. The housing has a first end with an opening to receive a drive spline from a motive source and an opposing second end. A brushless, rotating machine is located adjacent the first end and is kinetically connectable to the drive spline. A power control unit is adjacent the second end and electrically coupled to the brushless, rotating machine. The brushless, rotating machine is selected from the group consisting of a synchronous machine, a permanent magnet machine, and an induction machine.

In one embodiment, the motive source is an aircraft turbine engine.

DETAILED DESCRIPTION

Figure 1:
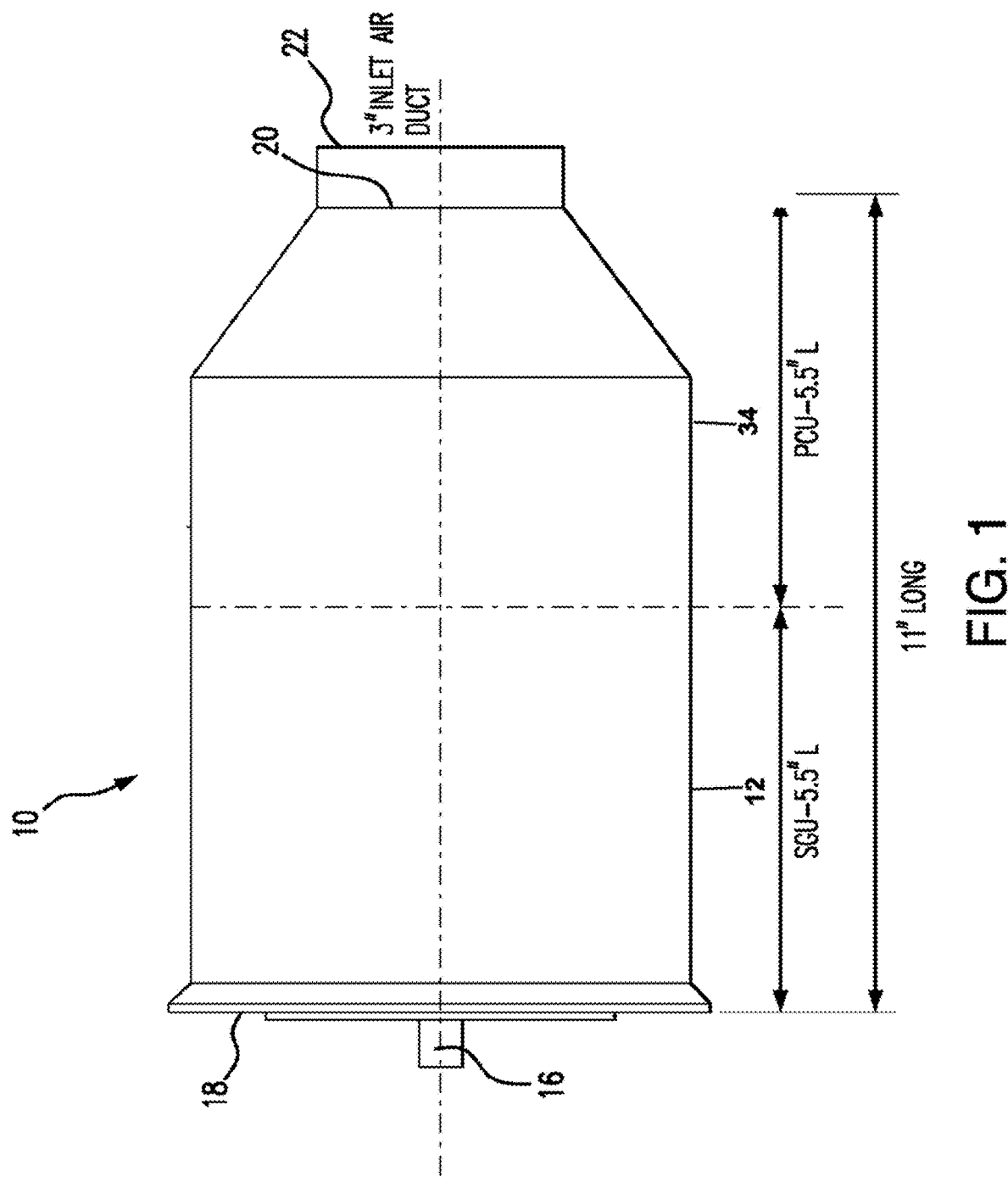
FIG. 1 illustrates a brushless starter-generator having an outside perimeter identical to that of a prior art brushed starter-generator. The figure also shows a relative allocation of space for a rotating machine and a power control unit (PCU).

FIG. 1 illustrates a housing 10 for a starter-generator system that includes a starter-generator unit (SGU) 12 and a power control unit (PCU) 34. A drive spline 16 extending from a first end 18 of the housing 10 kinetically connects the SGU 12 to a motive source, such as an aircraft turbine engine (not shown). An opposing second end 20 of the housing 10 terminates at an air inlet duct 22. As shown, the housing 10 is substantially barrel shaped with a nominal outside diameter of 6 inches with the barrel diameter tapering at the second end 20 to be approximately 3 inches in diameter at the air inlet duct 22. The length, exclusive of the air inlet duct 22, is approximately 11 inches.

Figure 2:
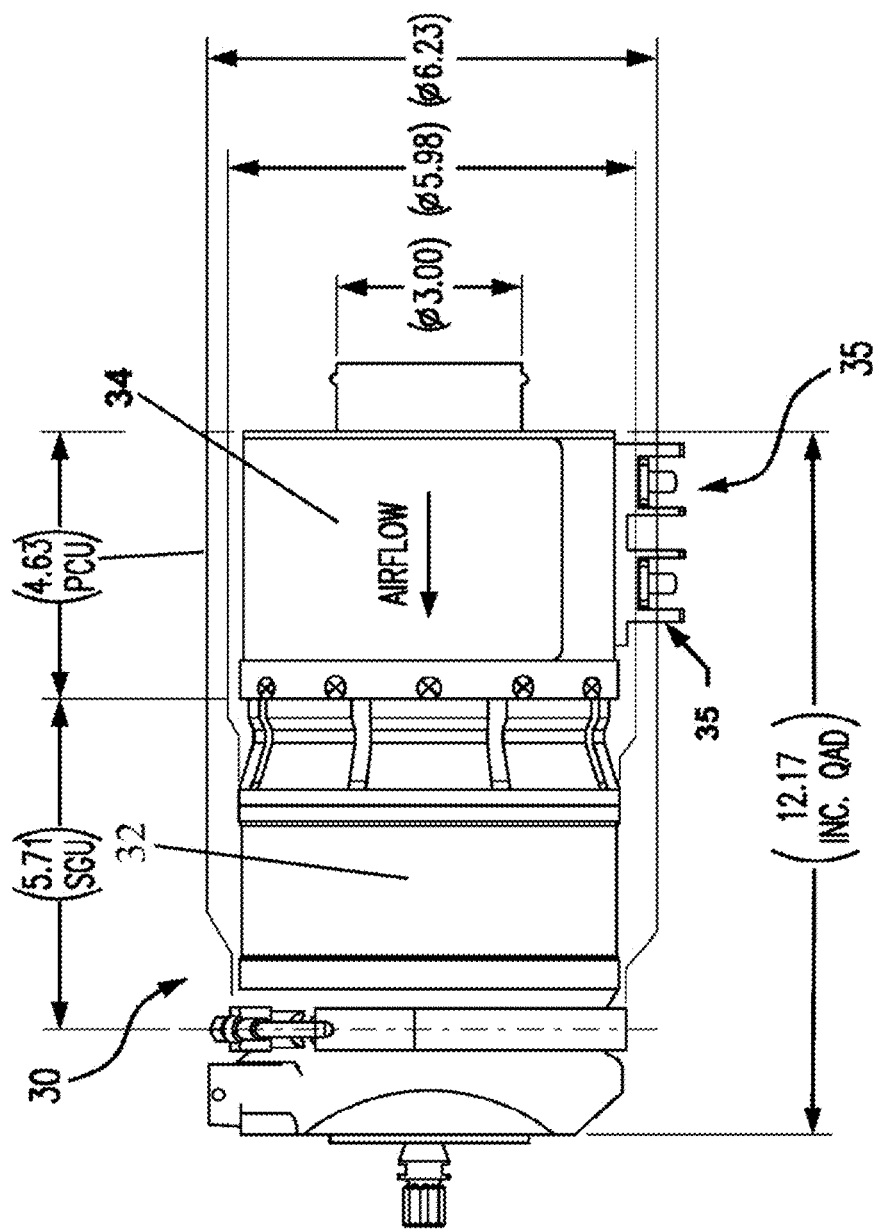
FIG. 2 reveals how a rotating machine could be dispositioned within its allocated space, still within the same dimensions as a brushed starter-generator.

With reference to FIG. 2, an integrated brushless starter-generator (IBSG) 30 combines a brushless, rotating machine 32 with its companion PCU 34 within the same housing dimensions as the brushed starter-generator system described above. The IBSG 30 of FIG. 2 is an exemplary embodiment of the SGU 12. Because the physical proportions are similar and the mechanical and electrical interfaces are identical, it becomes a true "drop-in" replacement for the commonly used brushed starter-generators used on small to medium sized aircraft, and which suffer from carbon brush-induced problems.

Figure 3A:
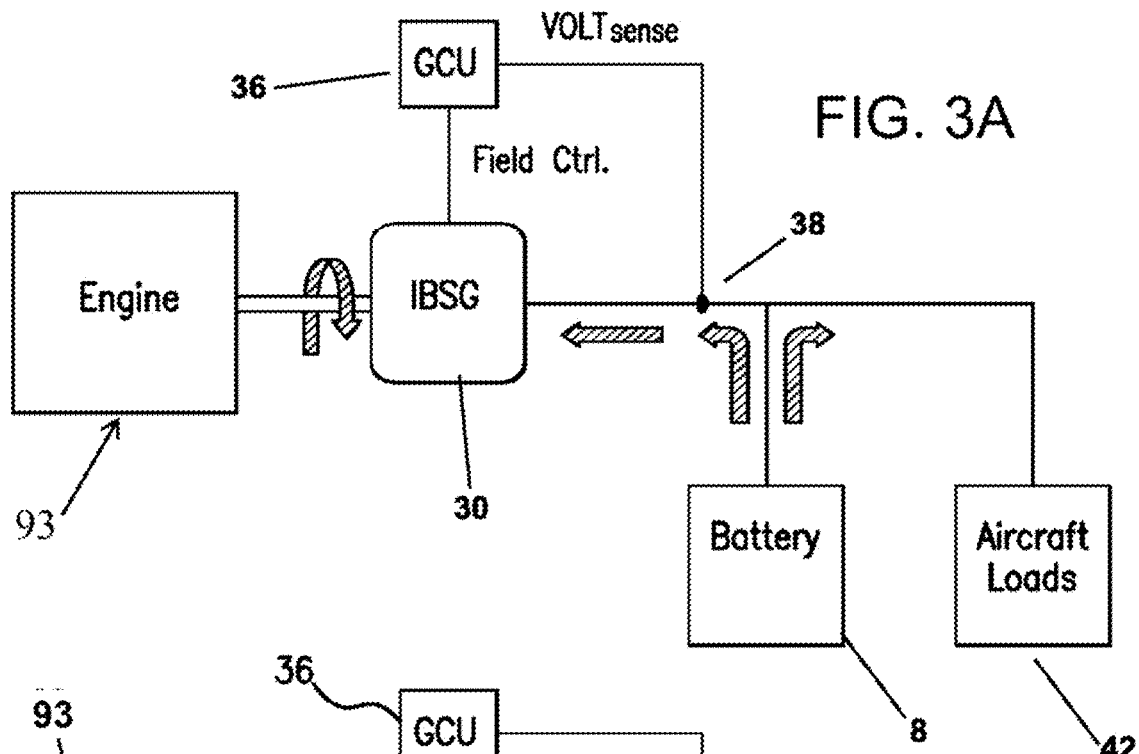
FIGS. 3A and 3B are block diagrams showing a start mode (FIG. 3A) and a generate mode (FIG. 3B) of a starter-generator system having a rotating machine and a power control unit, where the rotating machine is a synchronous machine.
Figure 3B:
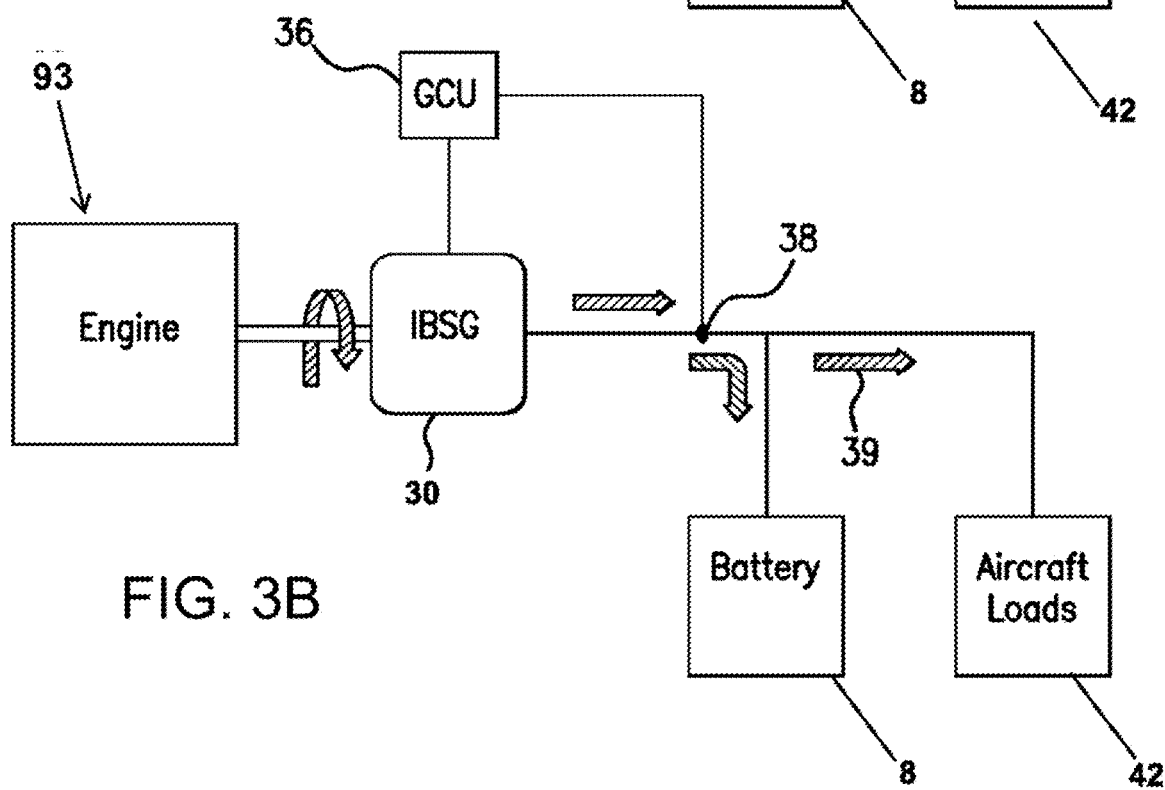
Figure 4:
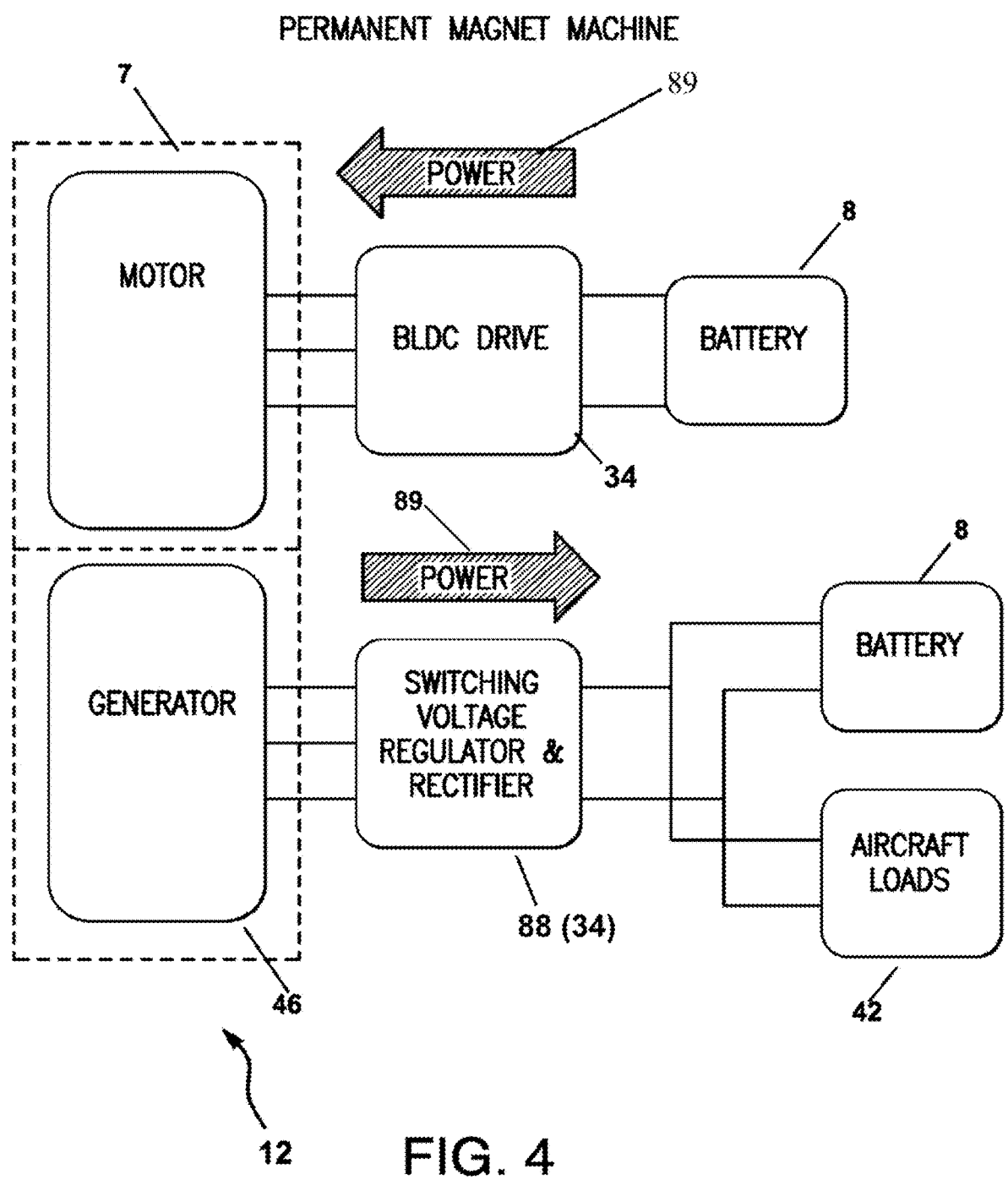
FIG. 4 is a block diagram showing a starter-generator system having a rotating machine and a power control unit, where the rotating machine is a permanent magnet machine.
Figure 5:
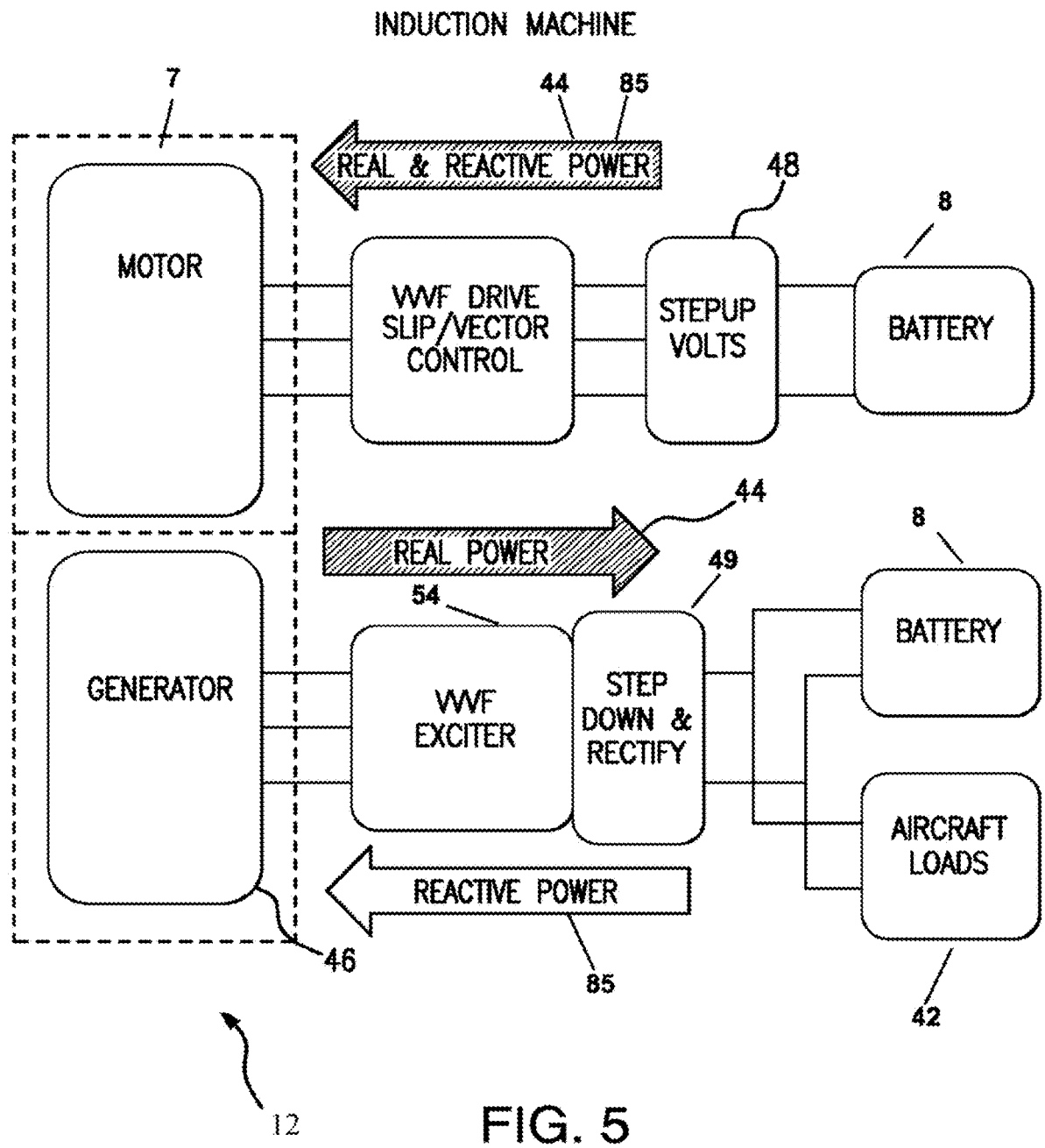
FIG. 5 is a block diagram showing a starter-generator system having a rotating machine and a power control unit, where the rotating machine is an induction machine.

With continuing reference to FIG. 2, the brushless rotating machine 32 portion of the IBSG 30 may use any number of viable topologies for the rotating machine 32 portion (e.g. a Synchronous Machine (SM) as shown in FIG. 3, a Permanent Magnet Machine (PMM) as shown in FIG. 4, or an Induction Machine (IM) as shown in FIG. 5) the selection of which would depend on the requirements of the final application. If a PMM, as shown in FIG. 4, is used then a temporary or permanent shaft disconnect is provided to stop the unit from turning and producing electrical power in case of a hazardous fault on the system. One such shaft disconnect is disclosed in U.S. Pat. No. 7,880,448 to Patterson. If an SM or IM is used, then it is sufficient to de-excite the field when a similar condition is encountered.

Referring back to FIG. 2, PCU 34 is combined within the same housing of the IBSG 30 as is the rotating machine 32. For this to be achievable, the PCU 34 must be simplified, streamlined and miniaturized, also ruggedized to withstand the harsh environments of the engine nacelle. Extensive use is made of software or firmware, largescale circuit integration, modularity and encapsulation. Alternatively, semiconductor compositions, such as silicon carbide that can withstand the high temperatures of an engine nacelle are considered. Various highly efficient power conversion topologies such as Vienna rectification may also be employed to reduce the heat load of the IBSG 30.

This IBSG 30 is employed on an aircraft engine for two functions:

Engine starting—a motor mode regime that is active from standstill to a cutoff speed that is close to idle Electrical power generation—a driven mode that converts mechanical power from the engine to usable electric power, exemplary is 28 VDC Start Mode During the start mode, nominal 28 VDC power is taken by the PCU 34 from the on-board batteries 8, an external power source or a generator mounted on a second engine that has already been started (cross-starting). This low voltage DC power is accepted by the PCU 34 via terminal block 35, then inverted, conditioned and delivered to the SGU 12 according to the position of the induced field versus rotor position, to maximize torque production per unit current. Acting as a motor, the SGU 12 thus develops the torque needed to start the engine quickly and efficiently. Using a smart PCU 34 versus a commutator has several advantages, not the least of which is to allow a controlled "soft start" that safeguards the engine and its drive train from stresses induced by torque spikes, and results in a lower energy drain from the batteries 8. In turn, this results in a greater number of start attempts possible.

Generate Mode

When the engine has reached idle speed and is capable of self-sustained operation, the unit reverts to a power generation mode. Generated power is provided to aircraft functions via the terminal block 35.

FIGS. 3A and 3B are block diagrams comparing the "start mode" of FIG. 3A to the "generate mode" of FIG. 3B. If the rotating machine used is an SM, an externally-mounted generator control unit (GCU) 36 takes over and varies the DC magnetic field of the rotating machine 32 to regulate at the Point of Regulation (POR) 38 the output voltage 39, compensating for changes in speed and electrical loading. It also provides the required protective functions such as over voltage, under voltage, over current, differential currents, as well as ancillary control functions such as current limiting and contactor control power. The PCU portion 34 that is most actively used during engine start is also used in generate mode (FIG. 3B) to rectify the output 39 of the rotating machine 32 to DC usable by the aircraft loads 42. Synchronous rectification is used extensively to enhance the overall efficiency of the generator.

Figure 6:
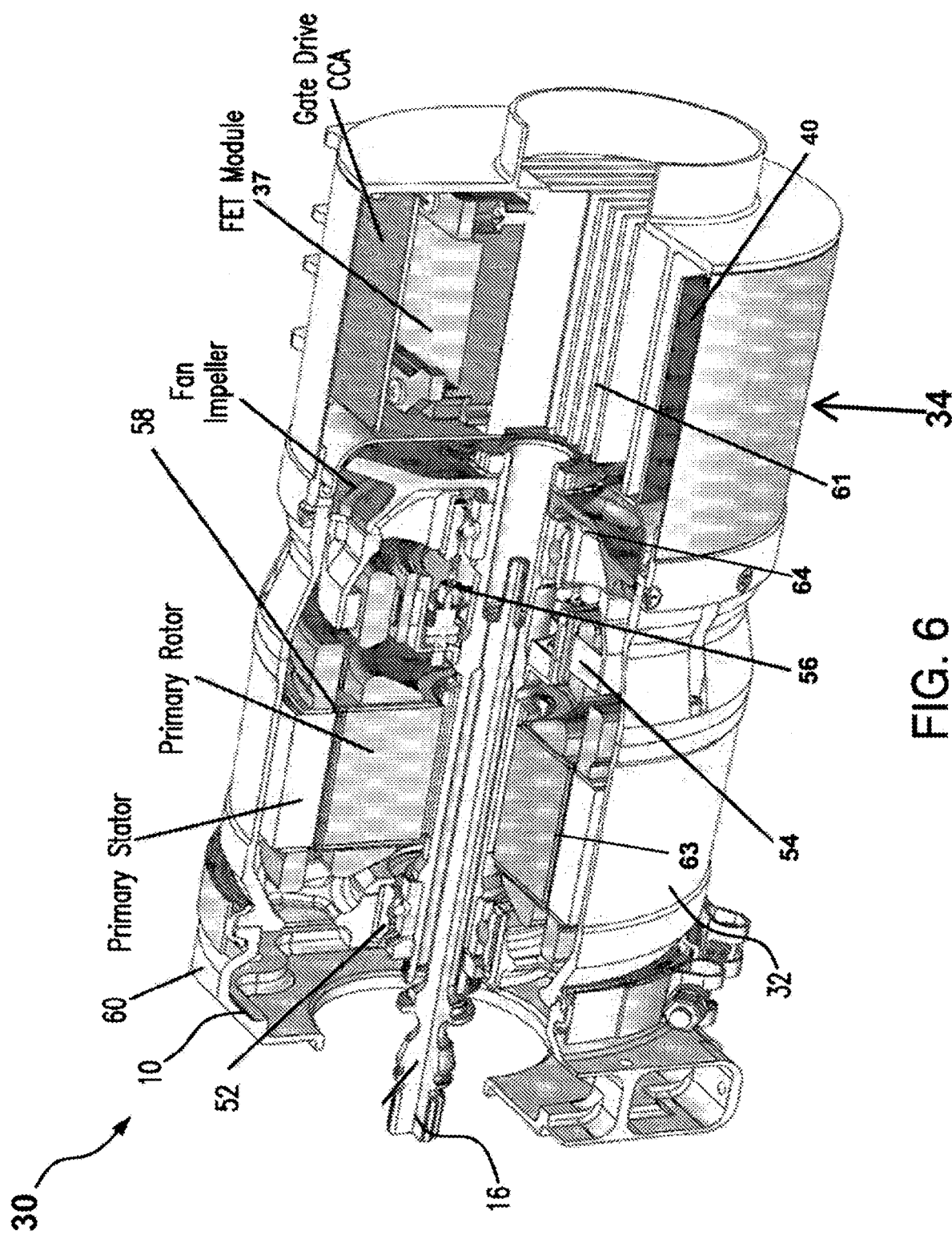
FIG. 6 is a schematic diagram showing a synchronous machine rotating machine integrated with a power control unit used during start.

FIG. 6 schematically illustrates an IBSG 30. Drive shaft 16 provides the motive force to rotate the rotating machine 32, which includes rotor windings 63, within housing 10 about bearings 52. A quick attach/disconnect 60 typically includes an alignment system, such as a key device, to enable coupling of the IBSG 30 to the aircraft engine in a coaxial relation and uncoupling of the IBSG 30 from the aircraft engine. FIG. 6 also shows a PCU 34 coupled to the anti-drive end (ADE) 64 of the rotating machine 32, along with the disposition of the circuit card assemblies (CCA) 40 within sealed compartments to protect them from harsh environments encountered in the engine nacelle. Heatsink fins 61 are placed in-line with the cooling air.

Figure 7:
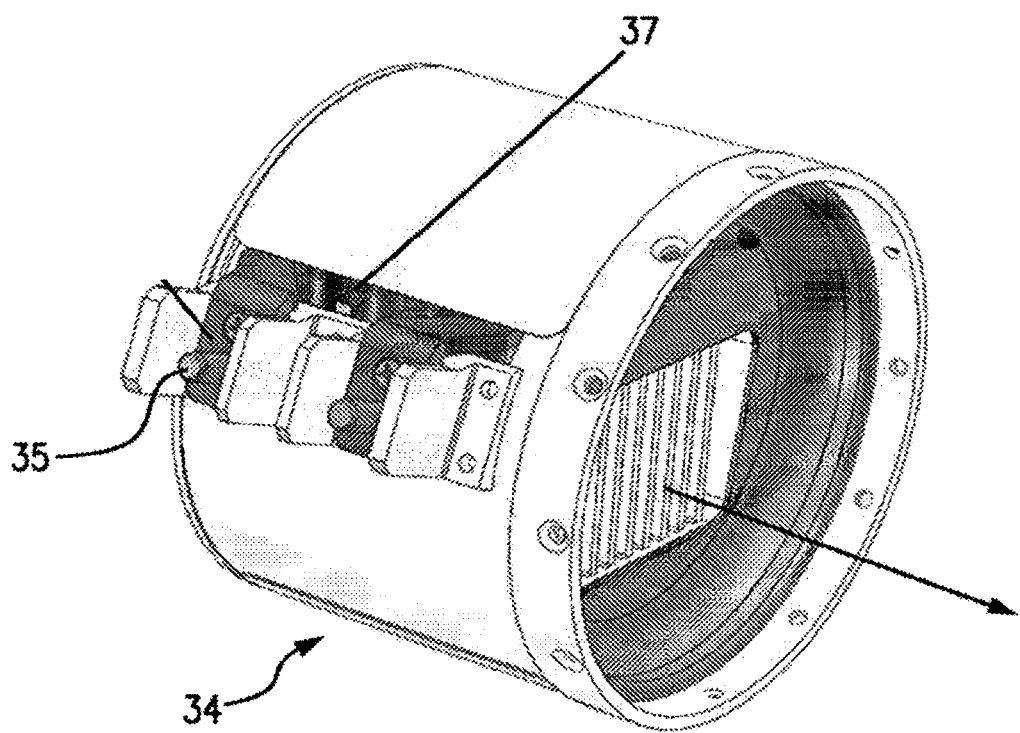
FIG. 7 is an exterior view of a power control unit.
Figure 8:
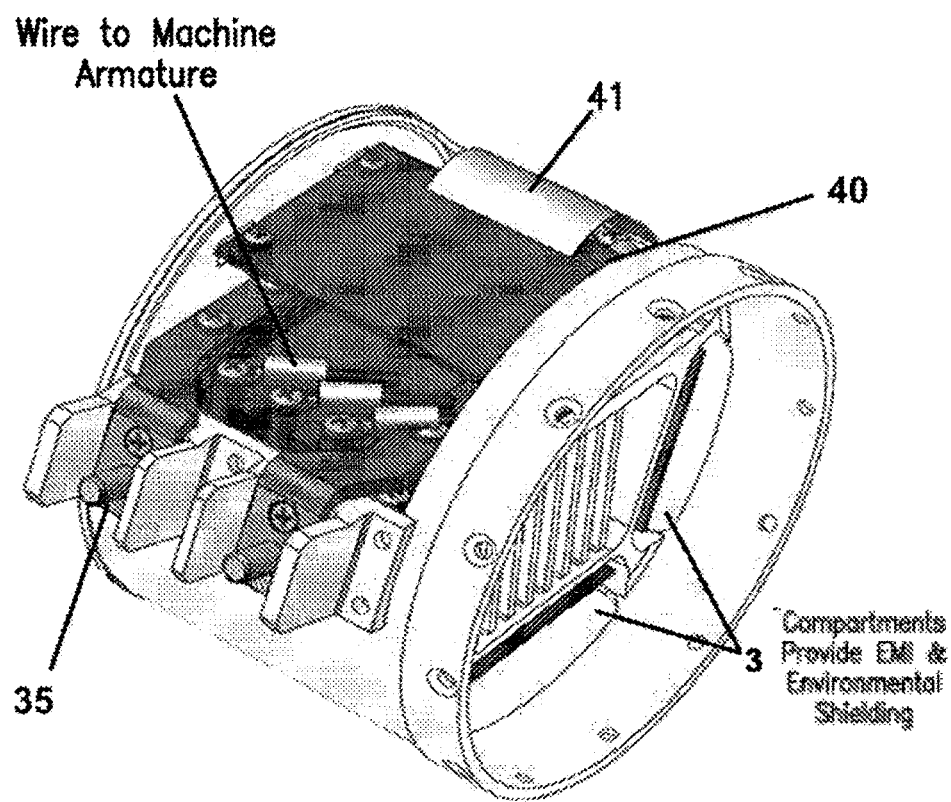
FIG. 8 is a schematic view of the power control unit of FIG. 7 with an exterior housing removed to illustrate underlying components.

FIG. 7 illustrates an exterior view of the PCU 34 including terminal block 35 for the transmission of DC electrical power to and from the SGU 12. Field effect transistor (FET) module 37 interconnects the terminal block 35 and other components of the PCU 34 to electrically invert the DC power to AC pulses needed to drive the machine in its function as a brushless engine starter. This is seen more clearly in FIG. 8 where the PCU 34 housing has been removed to disclose gate drive CCA 40 that provides the timing and logic to FET module 37 according to torque-speed profile. Flex cable 41 electrically interconnects the gate drive CCA to the other PC boards that are employed for EMI and environmental shielding 3.

Figure 9:
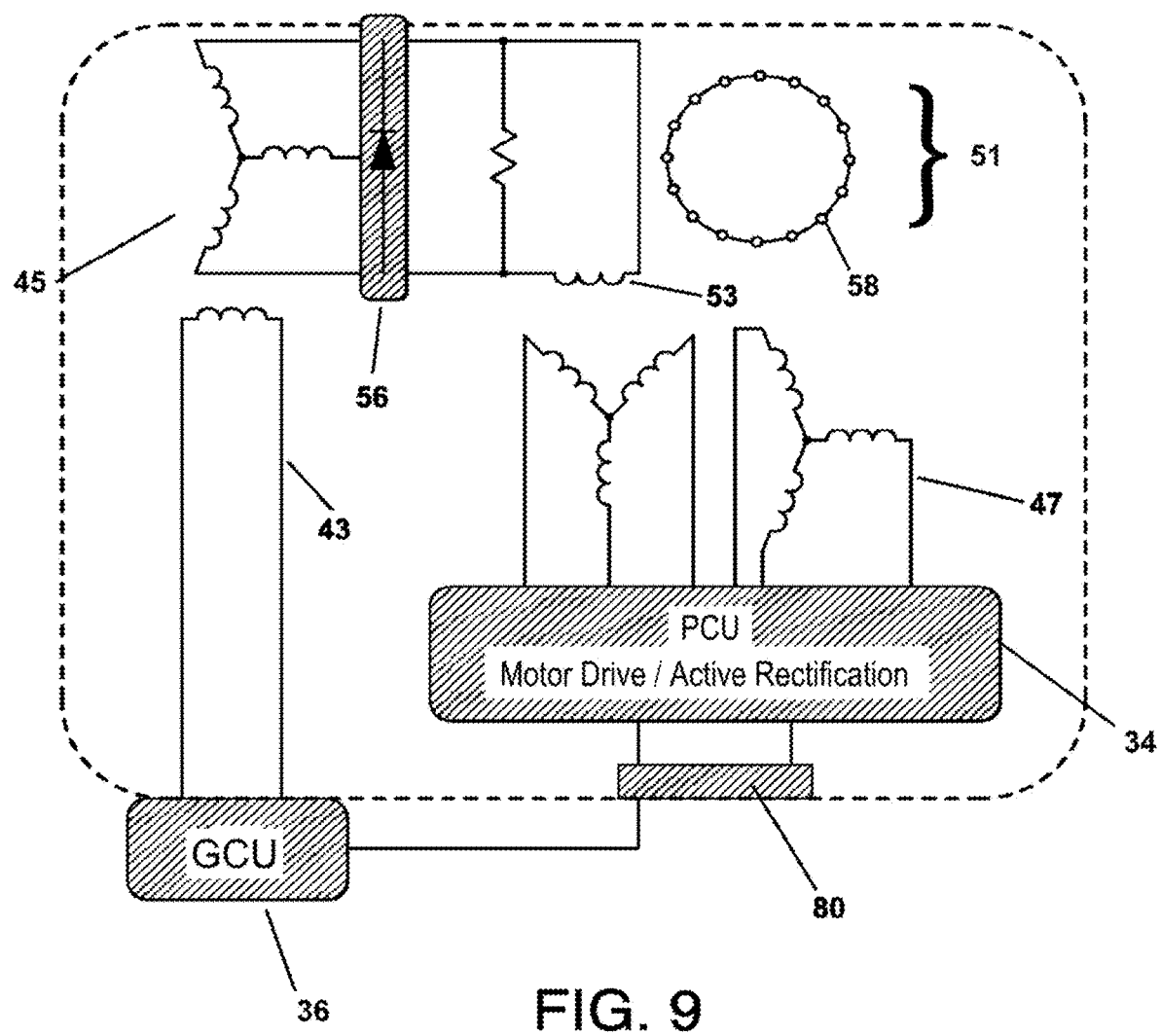
FIG. 9 is a machine topology view of the synchronous machine during generate mode with the external generator control unit (GCU) engaged.

The machine topology illustrated in FIG. 9 shows a typical, two-in-one brushless synchronous machine 32 electrically connected to an integrated PCU 34 and to a remote GCU 36. As a generator, the GCU 36 sends a DC current to the Exciter Control Field 43. This establishes a static DC magnetic field through which the conductors of the exciter armature 45 rotate, producing AC current. This AC current is rectified by the rotating diode bridge and delivered as DC to the main field 53, which is rotating. Thus interrupting the conductors in the stationary main armature 47, a usable AC power is produced which, before being delivered to the DC terminals 80, is rectified synchronously by the diodes located within the PCU FETs. The GCU 36 senses the output voltage and adjusts the DC current to the control field 43 accordingly, to maintain a regulated level of voltage. Thus, brushless generation of DC power from rotation is achieved.

Figure 10:
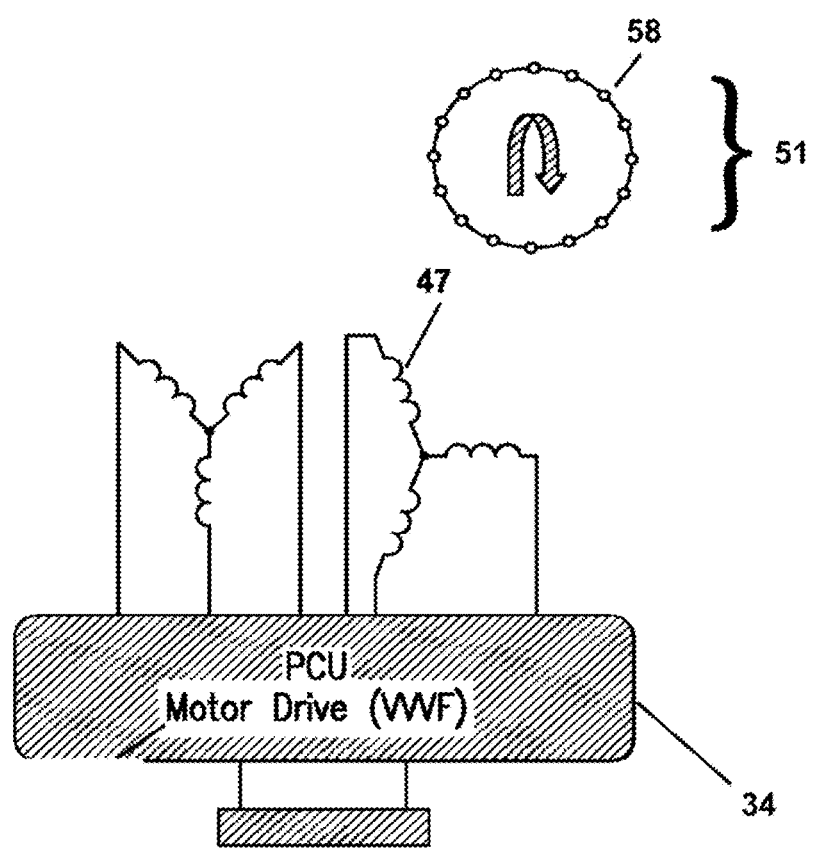
FIG. 10 is a machine topology view of the synchronous machine during start-up mode with the external generator control unit (GCU) disengaged.

The machine topology illustrated in FIG. 10 shows the synchronous machine described in FIG. 9 in a START mode. Here, the synchronous machine 32 is still integrated with the PCU 34, though only the armature 47 and the heavy damper (amortisseur) bars 58 are used to motorize the engine 93. In this mode, DC power is taken in by the PCU 34, then inverted to AC, conditioned and delivered to the armature of the machine 32, just like a controlled induction motor. It is also possible to motorize the machine 32 by a number of other methods that are well known in the prior art.

When used as a Synchronous Machine, there are certain trade-off technologies:
  Wound field for a controllable DC magnetic field
  Small unit, but requires an exciter 54 to excite the main field 53 without resorting to brushes or other sliding contacts
  Rotating diode stage 56 to rectify the AC output of the exciter rotor 54.
  Induction start using the machine's amortisseur circuit 58 as a squirrel cage 51.
  Easy and straightforward regulation as a generator; and
  Simple variable voltage, variable frequency (VVVF) converter to implement an effective start cycle Referring to FIG. 4, if the rotating machine 32 used is a PMM, the PCU 34 then becomes a power conditioning unit that regulates the output voltage by a buck topology that would switch the output, as commonly achieved with pulse-width modulation (PWM) circuitry. The PCU 34 also provides the protective functions listed above, although the differential current protection would result in activating the shaft disconnection device as described in U.S. Pat. No. 7,880,448, instead of simple de-excitation. In embodiments, the generator 46 uses a switching voltage regulator and rectifier 88 to regulate power 89 transferred from the generator to a battery 8 or directly to an aircraft 42. In embodiments, a motor 7, shown in FIGS. 4 and 5, may also use a Brushless DC (BLDC) drive 34 to transfer power 89 from a battery 8 to the motor 7.

When used as a Permanent Magnet Machine, there are certain trade-off technologies:
  Self-excited machine therefore yields the smallest and simplest design;
  Requires a shaft disconnect device to protect against arcing faults;
  Has a complicated switching regulation in the generate mode to compensate for changes in speed and electrical loading; and
  Would most effectively be used as BLDC motor in the START mode.

Referring to FIG. 5, if the rotating machine 32 used is an IM, the PCU 34 then becomes an excitation converter that shifts the phase of the real power 44 obtained from the rotating machine 32 and redelivers it as reactive power 85 of a frequency and amplitude commensurate with inducing a negative slip (an electrical frequency slightly lower (~5%) than the corresponding mechanical speed). The same protective functions are also provided by the PCU 34, with the provisions that they result in a de-excitation that stops the generator 46 from producing any power.

When used as an Induction Machine, there are certain trade-off technologies:
  Small and rugged unit;
  Works best with high voltages. Does not work well with low voltage, therefore:
  Requires a voltage step-up 48/step down 49 stage; and
  There are dynamic alternating current (AC) issues in the generate mode (FIG. 3B). These could produce oscillatory phenomena that threaten the longevity of the drive train.

Novelty of the concepts disclosed herein includes combining the PCU 34, traditionally located in the fuselage, with the SGU 12 that is attached to the engine 93 and must see and survive the hostile nacelle environment. The novelty also encompasses all the improvements implemented to simplify and miniaturize the PCU 34, and all the provisions taken to ruggedize it for a long and trouble-free life. Lastly, there exists novelty in implementing a brushless starter-generator 30 that meets or exceeds all requirements previously imposed on a brush-type unit, from a true drop-in replacement.

Further features include the ability to use an external generator control unit (GCU) 36 envelope for a controller.

I claim:

1. A starter-generator system contained within a single housing disposed within a nacelle of an aircraft, the starter-generator system comprising:
  said housing having first and second ends, wherein the first end includes a first end opening to receive a drive spline from a motive source, and wherein the second end includes a second end opening that is opposite the first end, the second end opening terminating at an air inlet duct;
  a brushless starter-generator unit adjacent the first end and kinetically connectable to the drive spline; and
  a power control unit adjacent the second end and electrically coupled to the brushless starter-generator unit, the power control unit including
    a terminal block configured to transmit DC electrical power to and from the starter-generator; and
    a field effect transistor module interconnecting the terminal block and a circuit card assembly configured to provide timing signals to the field effect transistor module;
  wherein in a start mode, the power control unit receives DC power via the terminal block, controls the FET module to invert the DC power to AC power at timing controlled by the circuit card assembly, and supplies the AC power to the starter-generator unit, and in a generate mode, the power control unit rectifies AC power received from the starter-generator unit to DC power and provides the DC power via the terminal block.

2. The starter-generator system of claim 1, wherein the brushless starter-generator unit is a brushless rotating machine that is selected from the group consisting of a synchronous machine, a permanent magnet machine, and an induction machine.

3. The starter-generator system of claim 2, wherein the motive source is a turbine engine or a piston engine of an aircraft.

4. The starter-generator system of claim 2, wherein the brushless rotating machine is synchronous, wherein the power control unit is used primarily in the start mode to motor the engine, and wherein the power control unit is used in the generate mode to synchronously rectify the AC output to DC for maximum rectification efficiency.

5. The starter-generator of claim 2, wherein the housing has external electrical and mechanical interfaces and physical proportions similar to those of a brushed starter-generator for small to medium size aircraft.

6. The starter-generator of claim 5, wherein the power control unit components are contained within environmentally sealed compartments within the housing for effective protection against the elements.

7. The starter-generator of claim 6, wherein a set of major heat producing components of the power control unit are connected to a heatsink placed in line with a cooling airstream, for effective cooling while protected from the environments.

8. The starter-generator system of claim 5, said starter-generator system configured to be deployed as a true drop-in replacement for a like-rated brushed starter-generator, wherein the housing has a substantially barrel shape, with a nominal outside diameter of 6 inches, the barrel diameter tapering at the second end to be approximately 3 inches in diameter at the air inlet duct, and a length, exclusive of the air inlet duct, of approximately 11 inches.

* * * * *